United States Patent [19]

Liakumovich et al.

[11] 3,927,038

[45] Dec. 16, 1975

[54] METHOD OF PRODUCING ISOMERS OF METHYLTETRAHYDROPHTHALIC ANHYDRIDE

[76] Inventors: Alexandr Grigorievich Liakumovich, prospekt Lenina, 23, kv. 4; Jury Ivanovidh Michurov, ulitsa Khudaiberdina, 125, kv. 36; Nina Vasilievna Zakharova, prospekt Lenina, 23, kv. 4, all of Sterlitamak; Mikhail Afanasievich Golubenko, Bolshaya Filevskaya ultisa, 45, korpus 2, kv. 27, Moscow; Genrikh Alexandrovich Tolstikov, ulitsa Dostoevskogo, 102/3, kv. 61, Ufa; Rakhil Samoilovna Kholodovskaya, Krasnoarmeiskaya ulitsa, 5, kv. 53, Moscow; Zoya Stepanovna Shalimova, ulitsa Volochaevskaya, 16-a, kv. 19, Sterlitamak; Taisia Vasilievna Legostaeva, prospekt Lenina, 30, kv. 19, Obninsk Kaluzhskoi oblasti; Vasily Dmitrievich Popov, ulitsa Revoljutsionnaya, 15, kv. 13; Vladimir Romanovich Dolidze, ulitsa Kurchatova, 30, kv. 6, both of Sterlitamak, all of U.S.S.R.

[22] Filed: Dec. 1, 1971

[21] Appl. No.: 203,820

[52] U.S. Cl. ......... 260/346.3; 260/346.6; 260/2 EA
[51] Int. Cl.² ...................................... C07D 307/89
[58] Field of Search ...................... 260/346.6, 346.3

[56] References Cited
UNITED STATES PATENTS
3,647,701    3/1972   Robinson et al. ................ 260/346.6

FOREIGN PATENTS OR APPLICATIONS
308,006    7/1971   U.S.S.R ........................... 260/346.6

OTHER PUBLICATIONS

Chemical Abstracts, Vol. 76, Abst. No. 14136e (Abstracts Inventor's Certificate, published 7-01-71) (1972).

Craig, Journal American Chem. Society (1950) Vol. 72, pp. 1678–1681.

Frank et al., Journal American Chem. Society (1947) Vol. 69, pp. 2313–2317.

Craig, Journal American Chem. Society, (1943) Vol. 65, pp. 1006–1013.

Boeseken et al., Recucil Des Travaux Chimique Des Pays Bas (1937) Vol. 56, pp. 1206–1207.

*Primary Examiner*—Henry R. Jiles
*Assistant Examiner*—Bernard I Dentz

[57] ABSTRACT

A method of producing isomers of methyltetrahydrophthalic anhydride consisting in condensing trans-piperylene and maleic anhydride in the presence of an organic solvent at 40°–90°C with subsequent thermal treatment of condensation products thus obtained at a temperature of 150°–250°C.

The method according to the invention permits the above-mentioned isomers to be obtained from a cheap raw material. The method is performed in simple equipment and is carried out without formation of by-products.

4 Claims, No Drawings

METHOD OF PRODUCING ISOMERS OF METHYLTETRAHYDROPHTHALIC ANHYDRIDE

The present invention relates to methods of producing isomers of methyltetrahydrophthalic anhydride to be used as hardeners for epoxy resins.

Known in the art is a method of producing isomers of methyltetrahydrophthalic anhydride by condensing a conjugated diene, such as isoprene with maleic anhydride in an organic solvent at 40°–90°C. In order to convert the solid product thus obtained into a liquid i.e. to the state suitable for its use as a hardener, this product is isomerized in the presence of catalysts of acid nature.

The disadvantage of the prior art method is that the second stage of the process in the presence of acidic catalysts should be performed in special corrosion-resistant reactors. Furthermore, the use of strongly acidic catalysts results in considerable polymerization of the starting diene and isomers thus obtained. Still other disadvantage of said method resides in the use of expensive isoprene as a raw material.

It is an object of the present invention to provide a method of producing isomers of methyltetrahydrophthalic anhydride which would permit the use of a catalyst of acidic nature to be dispensed with and to be performed in simple equipment.

A further object of the invention is to provide a method of producing isomers of methyltetrahydrophthalic anhydride which would eliminate the formation of by-products.

Still another object of the invention is to provide a method using a cheap raw material.

With the above and other objects in view, the invention consists in that the condensation of a conjugated diene and maleic anhydride is performed in an organic solvent at 40°–90°C. In this case, according to the invention, the conjugated diene comprises trans-piperylene. Products of the condensation are thermally treated at a temperature of 150°–250°C.

By this method isomers of methyltetrahydrophthalic anhydride are produced from a cheap raw material trans-piperylene. Catalysts of acidic nature are dispensed with. The method does not require special costly equipment, is technologically simple and is effected without formation of by-products.

It is advantageous to perform the condensation at a molar ratio between maleic anhydride and trans-piperylene of 1:1.05–1.2 respectively.

In order to improve the properties of the isomers being produced which are to be used as hardeners for epoxy resins, it is advantageous to add isoprene to the starting trans-piperylene. In this case it is advisable to introduce 10–12% of isoprene of the total weight of dienes and to perform the condensation at a molar ratio between maleic anhydride and the starting conjugated dienes of 1:1.05–1.2 respectively.

In order to minimize losses of the conjugated dienes used, it is advantageous to perform the condensation of starting reactants and thermal treatment of the condensation products in the presence of polymerization inhibitor for dienes comprising an alkylphenol or an aromatic amine. Of the above-said inhibitors, bis-(5-methyl-3-tertiary butyl-2-hydroxyphenyl)-methane is preferably used.

The method of producing isomers of methyltetrahydrophthalic anhydride according to the invention is performed in the following way.

Maleic anhydride is dissolved in an organic solvent, such as benzene, toluene, xylene. To the solution thus produced is added trans-piperylene in a stoichometric ratio, in a quantity less than the stoichiometric one or, as it was mentioned above, in excess, which is the most preferable. In case of an excess of trans-piperylene complete utilization of maleic anhydride is achieved, which would be otherwise very difficult to separate from the condensation products than unreacted diene.

The reaction mixture, which is thus obtained, is allowed to stay at 40°–90°C for 0.5–10 hours, and then unreacted reactants and the solvent are distilled off. The remaining solid product after distillation is heated up to 150°–250°C, is allowed to stay at this temperature for 3–10 hours and then cooled to room temperature. The product obtained after this treatment comprises a liquid.

It is advisable to add 10–20% of isoprene of a total weight of dienes to trans-piperylene prior to condensation, and to perform the condensation at a molar ratio between maleic anhydride and the starting dienes of 1:1.05–1.2 respectively. In this case condensation and treatment of condensation products are effected as hereinabove described. As a result, isomers of methyltetrahydrophthalic anhydride are produced which being also liquid at room temperature exhibit better properties as hardeners for epoxy resins.

Condensation of the above-said conjugated dienes and further thermal treatment of the condensation products being performed at elevated temperatures, polymerization of said dienes may occur with the formation of solid polymers insoluble in an organic solvent. This would result in losses of starting products and clogging of the equipment. This disadvantage may be eliminated by introducing into the starting reaction mixture a polymerization inhibitor for dienes. As inhibitors it is advantageous to use aromatic amines, such as para-(hydroxydiphenyl)amine, or alkylphenols, such as 2,6-ditert.-butyl-4-methylphenol, bis(5-methyl-3-tert.-butyl-2-hydroxyphenyl)methane. The best results are obtained when the latter of the above-mentioned inhibitors is used, in the presence of which polymers of the conjugated dienes used are practically not formed.

The invention will be better understood from the following examples of producing isomers of methyltetrahydrophthalic anhydride.

EXAMPLE 1

1 gram-mole of maleic anhydride was dissolved in 120 m$^3$ of toluene, then 0.1 g of 2,6-ditert.-butyl-4-methylphenol was introduced and 1.1 gram-mole of transpiperylene was added to the mixture. The mixture was allowed to stand at 50°C for 2 hours. Then unreacted trans-piperylene and toluene were distilled off, and the remaining product was heated up to 180°C and allowed to stay at this temperature for 5 hours, Then the product was distilled under vacuum and cooled to room temperature.

0.9 gram-mole of a product liquid at 20°C was obtained which comprised 3-methyl-Δ4-cyclohexene-1,2-dicarboxylic anhydride comprising two stereoisomers of the "chair" and "boat" types which were present in approximately equal quantities. The viscosity of the liquid product was 55 centistokes at 20°C.

EXAMPLE 2

1 gram-mole of maleic anhydride was dissolved in 200 cm$^3$ of benzene, then 0.152 g of bis(5-methyl-3-tert.-butyl-2-hydroxyphenyl)-methane was introduced, and 0.96 gram-mole of transpiperylene and 0.24 gram-mole of isoprene were added to the mixture. The mixture was heated at 40°C for 2.5 hours. Then unreacted trans-piperylene, isoprene and benzene were distilled off, and the remaining product was heated up to 210°C and allowed to stay at this temperature for 3.5 hours. Subsequently the product was distilled under vacuum and cooled to room temperature.

0.78 gram-mole of a product liquid at room temperature was obtained which comprised 3-methyl-Δ4-cyclohexene-1,2-dicarboxylic anhydride comprising two stereoisomers of the "chair" and "boat" types which were present in approximately equal quantities. The viscosity of the liquid product was 52 centistokes at 20°C.

EXAMPLE 3

1 gram-mole of maleic anhydride was dissolved in 210 cm$^3$ of benzene, and then 0.9 gram-mole of trans-piperylene and 0.1 gram-mole isoprene were added to the mixture. The mixture was heated at 60°C for 4.5 hours. Then unreacted dienes and benzene were distilled off, and the remaining product was heated up to 150°C and allowed to stay at this temperature for 4 hours. Then the product was distilled under vacuum and cooled to room temperature.

0.7 gram-mole of a mixture of isomers of methyltetrahydrophthalic anhydride liquid at room temperature was obtained. This mixture consisted of 90 mol% of 3-methyl-Δ4-cyclohexene-1,2-dicarboxylic anhydride and 10 mol% of 4-methyl-Δ4-cyclohexene-1,2-dicarboxylic anhydride. The viscosity of the liquid product was 45 centistokes at 20°C.

We claim:

1. A method of producing a liquid mixture of isomers of methyltetrahydrophthalic anhydride, consisting essentially of condensing trans-piperylene and maleic anhydride in an organic solvent at 40°–90°C., distilling off the solvent and unreacted reactants with subsequent thermal treatment of the solid residue consisting essentially of the condensation products at a temperature of 150°–250°C. to form a liquid product.

2. A method according to claim 1, wherein the condensation is carried out at a molar ratio between maleic anhydride and trans-piperylene of 1:1.05–1.2 respectively.

3. A method according to claim 1 wherein the condensation of starting reactants and thermal treatment of the condensation products are carried out in the presence of a diene polymerization inhibitor selected from the group consisting of alkylphenols.

4. A method according to claim 3, wherein said polymerization inhibitor is bis(5-methyl-3-tert.-butyl-2-hydroxyphenyl)methane.

* * * * *